United States Patent
Bai et al.

(10) Patent No.: US 12,132,230 B2
(45) Date of Patent: Oct. 29, 2024

(54) BATTERY CELL, BATTERY, POWER CONSUMPTION DEVICE, AND METHOD AND DEVICE FOR MANUFACTURING BATTERY CELL

(71) Applicant: CONTEMPORARY AMPEREX TECHNOLOGY CO., LIMITED, Ningde (CN)

(72) Inventors: Lulu Bai, Ningde (CN); Quankun Li, Ningde (CN); Ningsheng Wu, Ningde (CN); Wenlin Zhou, Ningde (CN); Ting Zheng, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/662,836

(22) Filed: May 13, 2024

(65) Prior Publication Data
US 2024/0297422 A1    Sep. 5, 2024

Related U.S. Application Data

(63) Continuation of application No. PCT/CN2022/071918, filed on Jan. 14, 2022.

(51) Int. Cl.
*H01M 50/538* (2021.01)
*H01M 50/191* (2021.01)
(Continued)

(52) U.S. Cl.
CPC ....... *H01M 50/538* (2021.01); *H01M 50/191* (2021.01); *H01M 50/474* (2021.01);
(Continued)

(58) Field of Classification Search
CPC .. H01M 50/536; H01M 50/50; H01M 50/502; H01M 50/503; H01M 50/509;
(Continued)

(56) References Cited

U.S. PATENT DOCUMENTS

| 2006/0166088 A1 | 7/2006 | Hokanson et al. |
| 2012/0094161 A1* | 4/2012 | Zheng ................. H01M 50/509 429/94 |

(Continued)

FOREIGN PATENT DOCUMENTS

| CN | 101877413 A | 11/2010 |
| CN | 202678429 U | 1/2013 |

(Continued)

OTHER PUBLICATIONS

The World Intellectual Property Organization (WIPO) International Search Report and Written Opinion for PCT/CN2022/071918 Oct. 10, 2022 12 Pages (including translation).

*Primary Examiner* — Helen Oi K Conley
*Assistant Examiner* — Amanda Rosenbaum
(74) *Attorney, Agent, or Firm* — ANOVA LAW GROUP, PLLC

(57) ABSTRACT

A battery cell includes electrode assemblies arranged in a first direction, where an end part of each electrode assembly along a second direction perpendicular to the first direction is provided with a tab; and a connection member configured to connect tabs of the electrode assemblies and an electrode terminal of the battery cell. The connection member includes a main body portion and a pin, the main body portion extends along the first direction, and includes a first surface and a second surface perpendicular to the second direction, the main body portion is provided with a plurality of through grooves passing through the first surface and the second surface, and the plurality of through grooves are respectively (Continued)

configured to accommodate the tabs of the plurality of electrode assemblies.

20 Claims, 16 Drawing Sheets

(51) Int. Cl.
  *H01M 50/474* (2021.01)
  *H01M 50/536* (2021.01)
  *H01M 50/567* (2021.01)
  *H01M 50/593* (2021.01)

(52) U.S. Cl.
  CPC ....... *H01M 50/536* (2021.01); *H01M 50/567* (2021.01); *H01M 50/593* (2021.01)

(58) Field of Classification Search
  CPC ............. H01M 50/514; H01M 50/516; H01M 50/529; H01M 50/528; H01M 50/533; H01M 50/538; H01M 50/547; H01M 50/567; H01M 50/296; H01M 50/183; H01M 50/593
  See application file for complete search history.

(56) References Cited

U.S. PATENT DOCUMENTS

| | | | | |
|---|---|---|---|---|
| 2016/0056423 | A1* | 2/2016 | Seo | H01M 50/172 |
| | | | | 429/179 |
| 2016/0099444 | A1* | 4/2016 | Park | H01M 50/566 |
| | | | | 429/82 |
| 2017/0098813 | A1* | 4/2017 | Yoo | H01M 50/119 |
| 2017/0155097 | A1* | 6/2017 | Kang | H01M 50/147 |
| 2018/0123110 | A1* | 5/2018 | Hirose | H01M 4/0404 |
| 2019/0221877 | A1* | 7/2019 | Li | H01M 50/533 |
| 2021/0066700 | A1* | 3/2021 | Wang | H01M 50/529 |
| 2021/0257704 | A1* | 8/2021 | Sawada | H01M 50/213 |

FOREIGN PATENT DOCUMENTS

| | | |
|---|---|---|
| CN | 102931374 A | 2/2013 |
| CN | 109713353 B | 12/2020 |
| JP | 2010135170 A | 6/2010 |
| WO | 2007121445 A2 | 10/2007 |

* cited by examiner

BATTERY CELL, BATTERY, POWER CONSUMPTION DEVICE, AND METHOD AND DEVICE FOR MANUFACTURING BATTERY CELL

CROSS-REFERENCE TO RELATED APPLICATION

This application is a continuation of International Application No. PCT/CN2022/071918, filed on Jan. 14, 2022, the entire content of which is incorporated herein by reference.

TECHNICAL FIELD

The present application relates to the field of battery technology, in particular to a battery cell, a battery, a power consumption device, and a method and device for manufacturing a battery cell.

BACKGROUND

Energy saving and emission reduction is the key to sustainable development of the automobile industry. Under such circumstance, electric vehicles have become an important component of the sustainable development of the automobile industry due to advantages in energy saving and environmental protection. For the electric vehicles, battery technology is an important factor for their development. A battery is composed of a plurality of battery cells, and therefore, improving performance of each battery cell has become a technical problem to be urgently solved in the battery technology.

SUMMARY

The present application provides a battery cell, a battery, a power consumption device, and a method and device for manufacturing a battery cell, which could realize connection of a plurality of electrode assemblies in an interior of the battery cell, and improve performance of the battery cell.

In a first aspect, there is provided a battery, including:
- a plurality of electrode assemblies arranged along a first direction, where an end part of each electrode assembly of the plurality of electrode assemblies along a second direction is provided with a tab, and the second direction is perpendicular to the first direction; and
- a connection member configured to connect tabs of the plurality of electrode assemblies and an electrode terminal of the battery cell, where the connection member includes a main body portion and a pin, the main body portion extends along the first direction, the main body portion includes a first surface and a second surface perpendicular to the second direction, the main body portion is provided with a plurality of through grooves passing through the first surface and the second surface, and the plurality of through grooves are respectively configured to accommodate the tabs of the plurality of electrode assemblies, so that the tab of each electrode assembly passes through a corresponding through groove from the first surface to be electrically connected to the second surface, the pin is disposed on the second surface, and the pin is configured to be electrically connected with the electrode terminal.

Based on the technical solution, the connection member in the battery cell includes the main body portion, and the main body portion includes the plurality of through grooves, and the tabs of the plurality of electrode assemblies pass through the corresponding through grooves from the first surface of the main body portion respectively to be electrically connected to the second surface of the main body portion, so as to be able to realize the connection of the plurality of electrode assemblies in the interior of the battery cell, and since the tab is connected to a side of the connection member away from the interior of the battery cell, a risk of short circuit caused by the end part of the tab inserted into an electrode sheet due to redundancy or vibration and shock at the end part of the tab is reduced. The connection member further includes the pin disposed on the second surface of the main body portion. The pin is configured to connect the electrode terminal of the battery cell. Since the pin is located at the side of the connection member away from the interior of the battery cell, particulate matter generated in the process of welding with the electrode terminal will be blocked by the main body portion of the connection member so as not to fall into the interior of the battery cell, thereby reducing the risk of short circuit, and improving the safety of the battery cell. It can be seen that through the through grooves and the pin disposed on the connection member, not only can the connection between the plurality of electrode assemblies in the interior of the battery cell be realized conveniently, but also the safety of the process of welding the connection member and the electrode terminal can be ensured.

In some embodiments, a part of the tab of each electrode assembly protruding from the second surface is bent toward the first direction to form a first connecting portion, and the first connecting portion is welded to the second surface.

Since the tab of each electrode assembly protrudes from the first surface of the connection member to the second surface, and is bent to form the first connecting portion, the first connecting portion is welded to the second surface, thereby reducing the difficulty of bending and welding the tab.

In some embodiments, the electrode terminal is provided with a through hole, the pin passes through the through hole and is bent toward the electrode terminal to form a second connecting portion parallel to the second surface, and the second connecting portion is connected with the electrode terminal.

Since the pin on the connection member is located on the second surface away from the interior of the battery cell and is bent to form the second connecting portion, the second connecting portion passes through the through hole of the electrode terminal and is then connected with the electrode terminal, and difficulty of bending and welding the pin is reduced.

The number of pins may be multiple, such as two, so as to be able to realize shunting at the position where the connection member is connected with the electrode terminal, avoid temperature rise caused by overcurrent in the battery cell, and improve safety and reliability of the battery cell 20.

In some embodiments, one end of the electrode terminal away from an interior of the battery cell is provided with a first step structure surrounding the through hole, and the second connecting portion is located in the first step structure and welded with the first step structure.

The first step structure can be configured to accommodate the second connecting portion formed after the pin of the connection member is bent, which provides a welding space between the electrode terminal and the second connecting portion, and improves a space utilization rate of the battery cell. In addition, since the second connecting portion is away from the interior of the battery cell relative to the first step structure, the electrode terminal can be further prevented from being separated with a top cover of the battery cell to a certain extent, which improves the structural safety of the battery cell.

In some embodiments, the battery cell further includes: a metal sealing block, where the metal sealing block covers the connection member and the through hole from a side away from the interior of the battery cell, and is connected with the electrode terminal. The metal sealing block can realize the sealing of the battery cell and improve the safety of the battery cell.

In some embodiments, one end of the electrode terminal away from the interior of the battery cell is provided with a second step structure surrounding the first step structure, the second step structure is away from the interior of the battery cell relative to the first step structure, an edge of the metal sealing block is located in the second step structure, and the edge of the metal sealing block forms a sealed connection with the second step structure by means of welding.

The second step structure can be configured to accommodate the metal sealing block, provide a welding space between the metal sealing block and the electrode terminal, and improve the space utilization rate of the battery cell. In addition, since the metal sealing block is away from the interior of the battery cell relative to the second step structure, particulate matter generated in the process of welding can be further prevented from falling into the interior of the battery cell, and the safety of the battery cell is improved.

In some embodiments, the metal sealing block protrudes from the second step structure along a direction away from the interior of the battery cell. The thickness of the metal sealing block can exceed the depth of the second step structure, so that the metal sealing block protrudes from the second step structure toward the direction away from the interior of the battery cell, so as to facilitate subsequent connection operations of the battery cell, and enable the structure of the battery cell to be more stable.

In some embodiments, the first surface of the connection member is provided with a first insulating layer for isolating the plurality of electrode assemblies from the connection member so as to ensure the safety of the battery cell.

In some embodiments, the battery cell further includes: a housing, an end part of which in the second direction is provided with an opening, where the housing is configured to accommodate the plurality of electrode assemblies; and an end cover configured to cover the opening, where the end cover is provided with an electrode lead-out hole, the electrode terminal surrounds the electrode lead-out hole, and the electrode terminal protrudes from an interior of the electrode lead-out hole.

In some embodiments, the end cover includes: a first fixing member, where the first fixing member at least partially surrounds the electrode terminal, so as to fix the electrode terminal to the first fixing member; and a second fixing member, where the second fixing member is connected to the end cover, and the second fixing member is separated from the electrode terminal by the first fixing member; where one of the first fixing member and the second fixing member is provided with an embedding hole, and the other of the first fixing member and the second fixing member is provided with an embedding part embedded in the embedding hole.

The end cover and the electrode terminal are connected to each other through the first fixing member and the second fixing member. The first fixing member is engaged with the electrode terminal. The second fixing member is engaged with the end cover and the first fixing member at the same time, so that the first fixing member and the electrode terminal are connected and fixed to the end cover through the second fixing member. The first fixing member and the second fixing member are connected and fixed to each other through the engagement of the embedding hole and the embedding part. Since the embedding part will be limited after being embedded in the embedding hole, the embedding part is not easy to escape from the embedding hole when subjected to an external force, and not easy to move along a radial direction of the embedding hole relative to the embedding hole. Therefore, the first fixing member and the second fixing member are connected and fixed by means of embedding, which can ensure that the two are not easy to be separated from each other, and at the same time, the relative position of the two is not easy to change when they are subjected to external force. In this way, stability of connection between the first fixing member and the second fixing member is effectively improved, thereby effectively preventing the first fixing member and the electrode terminal from falling off or being separated from the end cover so as not to cause problems such as liquid leakage of the battery cell, and improve the reliability and safety of the battery cell. In addition, since the fixing structure of the electrode terminal in the interior of the housing can be omitted, space occupied in the interior of the battery cell can be reduced, so as to increase energy density of the battery cell.

In some embodiments, the battery cell further includes: a sealing member disposed between the end cover and the electrode terminal, where the sealing member is disposed around the electrode lead-out hole to form a sealed connection between the electrode terminal and the end cover. The sealing member can improve the sealing performance between the electrode terminal and the end cover, avoid the problem of liquid leakage caused by poor sealing between the electrode terminal and the end cover, and can further improve the reliability of the battery cell.

In some embodiments, the end cover is provided with an annular groove, the sealing member is accommodated in the annular groove, and the second fixing member is configured to enable the electrode terminal to press the sealing member toward the end cover so as to form sealing between the electrode terminal and the end cover. The annular groove is configured to accommodate the sealing member, which facilitates the positioning of the sealing member.

In some embodiments, the battery cell further includes: a spacer plate covering surfaces of the plurality of electrode assemblies parallel to the first direction and the second direction, where the spacer plate is configured to isolate the surfaces of the plurality of electrode assemblies from the housing.

The spacer plate can protect the electrode assemblies, and during the process of putting the electrode assemblies into the housing, it can avoid damage caused by friction between a separator coated on outer surfaces of the electrode assemblies and a wall of the housing, and prevent an electrode sheet from being bent and creased at an R corner of the housing.

In some embodiments, the surfaces of the plurality of electrode assemblies are provided with a second insulating layer, and the spacer plate is connected to the second insulating layer by heat fusion. In this way, the connection between the spacer plate and the electrode assemblies can be realized without setting an additional structure.

In some embodiments, the battery cell further includes: an insulating member disposed between the second surface of the connection member and the end cover, where the spacer plate is connected with the insulating member to fix the spacer plate to the surfaces of the plurality of electrode assemblies. The connection between the spacer plate and the electrode assemblies can be realized by only connecting the spacer plate with the insulating member, which is simple in assembling, and does not require an additional component.

In some embodiments, the number of pins is multiple, and/or the pin has one or more second connecting portions.

In some embodiments, the electrode assembly has a coiled structure and is flat, and an outer surface of the electrode assembly includes two flat surfaces, and the two flat surfaces are disposed opposite to each other along the first direction; or, the electrode assembly has a laminated structure, and a first electrode sheet, a separator and a second electrode sheet of the electrode assembly are stacked along the first direction.

The above technical solution may be applied to various types of electrode assemblies, for example, an electrode assembly in a flat coiled structure or a laminated structure, and has a wide range of applications.

In a second aspect, there is provided a battery including the battery cell in the first aspect or any possible implementation manner of the first aspect.

In a third aspect, there is provided a power consumption device including the battery cell in the first aspect or any possible implementation manner of the first aspect, where the battery cell is configured to provide electric energy.

In a fourth aspect, there is provided a method for manufacturing a battery cell, including: providing a plurality of electrode assemblies, where the plurality of electrode assemblies are arranged along a first direction, an end part of each electrode assembly of the plurality of electrode assemblies along a second direction is provided with a tab, and the second direction is perpendicular to the first direction; providing a connection member, where the connection member includes a main body portion and a pin, the main body portion extends along the first direction, the main body portion includes a first surface and a second surface perpendicular to the second direction, the main body portion is provided with a plurality of through grooves passing through the first surface and the second surface, the plurality of through grooves are respectively configured to accommodate tabs of the plurality of electrode assemblies, and the pin is disposed on the second surface; enabling the tab of each electrode assembly to pass through a corresponding through groove from the first surface of the connection member to be electrically connected to the second surface; and electrically connecting the pin of the connection member with an electrode terminal.

In a fifth aspect, there is provided a device for manufacturing a battery cell, including: a first providing module configured to provide a plurality of electrode assemblies, where the plurality of electrode assemblies are arranged along a first direction, and an end part of each electrode assembly of the plurality of electrode assemblies along a second direction is provided with a tab, and the second direction is perpendicular to the first direction; a second providing module configured to provide a connection member, where the connection member includes a main body portion and a pin, the main body portion extends along the first direction, the main body portion includes a first surface and a second surface perpendicular to the second direction, the main body portion is provided with a plurality of through grooves passing through the first surface and the second surface, the plurality of through grooves are respectively configured to accommodate tabs of the plurality of electrode assemblies, and the pin is disposed on the second surface; a first assembling module configured to enable the tab of each electrode assembly to pass through a corresponding through groove from the first surface of the connection member to be electrically connected to the second surface; and a second assembling module configured to electrically connect the pin of the connection member with an electrode terminal.

BRIEF DESCRIPTION OF THE DRAWINGS

In order to illustrate technical solutions in embodiments of the present application more clearly, the following briefly introduces accompanying drawings required for describing the embodiments of the present application. Obviously, the following described accompanying drawings are merely some embodiments of the present application, and those of ordinary skill in the art may still derive other drawings from these accompanying drawings without involving creative efforts.

Figure 1:
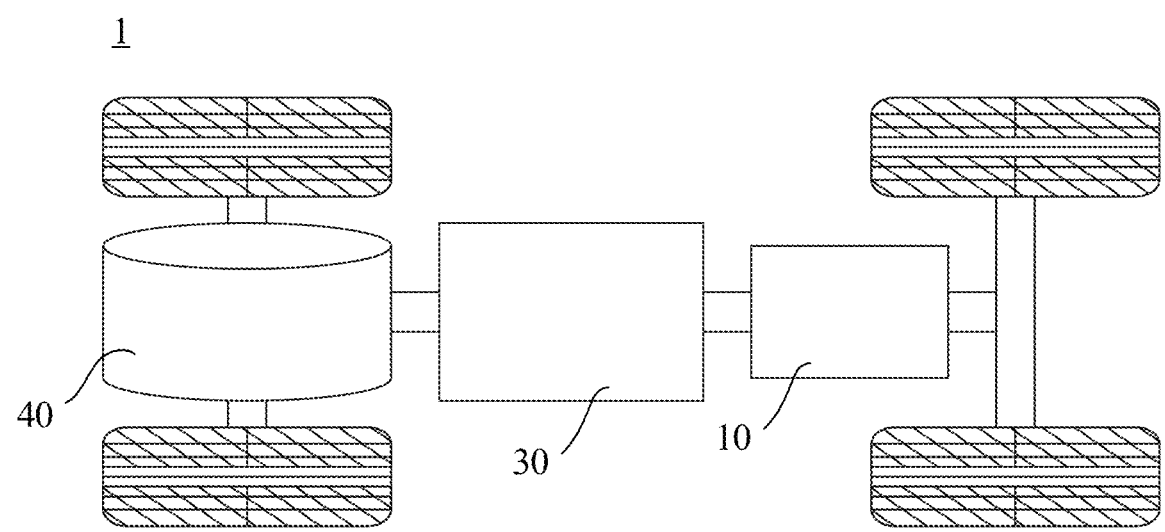
FIG. 1 is a schematic structural diagram of a vehicle disclosed in an embodiment of the present application.

In the accompanying drawings, the accompanying drawings are not necessarily drawn to actual scale.

DESCRIPTION OF EMBODIMENTS

Embodiments of the present application will be further described in detail below in conjunction with the accompanying drawings and the embodiments. The following detailed description of the embodiments and the accompanying drawings are used to illustrate the principles of the present application in examples, but not to limit the scope of the present application, that is, the present application is not limited to the described embodiments.

In the description of the present application, it should be noted that the phrase "a plurality of" means two or more, unless otherwise specified. Orientations or positional relationships indicated by terms "upper", "lower", "left", "right", "inner", "outer", or the like are only for the convenience of describing the present application and simplifying the description, and do not indicate or imply that an apparatus or element referred to must have a specific orientation, be constructed and operated in a specific orientation, and therefore cannot be understood as limitations to the present application. In addition, terms such as "first", "second" and "third" are only used for descriptive purposes, and should not be understood as indicating or implying relative importance. "Vertical" is not vertical in a strict sense, but within an allowable range of errors. "Parallel" is not parallel in a strict sense, but within an allowable range of errors.

Orientation words appearing in the following description are all directions shown in the drawings, and are not intended to limit the specific structure of the present application. In the description of the present application, it should be further noted that unless otherwise explicitly specified and defined, terms such as "installation", "interconnection", and "connection" should be interpreted in a broad sense, for example, it may be a fixed connection, or a detachable connection, or an integrated connection; or it may be a direct connection, or an indirect connection through an intermediate medium. Those of ordinary skill in the art can understand the specific meanings of the above terms in the present application according to specific situations.

The term "and/or" in the present application is only a kind of association relationship describing associated objects, which means that there may be three kinds of relationships. For example, A and/or B may mean the following three cases: A exists alone, both A and B exist at the same time, and B exists alone. In addition, the character "/" in the present application generally indicates that the associated objects before and after the character are in an "or" relationship. In this disclosure, the phrases "at least one of A, B, and C" and "at least one of A, B, or C" both mean only A, only B, only C, or any combination of A, B, and C.

Unless otherwise defined, all technical and scientific terms used in the present application have the same meanings as those commonly understood by those skilled in the art to which the present application belongs. The terms used in the specification of the present application are merely for the purpose of describing specific embodiments, but are not intended to limit the present application. The terms "comprising" and "having" and any variations thereof in the specification and the claims of the present application as well as the foregoing description of the accompanying drawings are intended to cover non-exclusive inclusions. In the specification and the claims or the above accompanying drawings of the present application, terms such as "first" and "second" are used for distinguishing different objects, rather than describing specific order or primary-secondary relationship.

A word "embodiment" referred to in the present application means that a particular feature, structure, or characteristic described in combination with the embodiment can be included in at least one embodiment of the present application. The appearances of the word in various places in the specification are not necessarily all referring to the same embodiment, nor is it a separate or alternative embodiment mutually exclusive of other embodiments. Those skilled in the art understand, in explicit and implicit manners, that an embodiment described in the present application may be combined with other embodiments.

While the present application has been described with reference to some embodiments, various improvements may be made and equivalents may be used to substitute parts therein without departing from the scope of the present application. In particular, as long as there is no structural conflict, technical features mentioned in various embodiments can be combined in any manner. The present application is not limited to the specific embodiments disclosed herein, but includes all technical solutions falling within the scope of the claims.

A battery mentioned in the present application refers to a single physical module that includes one or more battery cells to provide a higher voltage and capacity. For example, a battery mentioned in the present application may include a battery module, a battery pack, and the like. The battery generally includes a box for enclosing one or more battery cells. The box can prevent liquid or other foreign matters from affecting the charging or discharging of a battery cell.

In some embodiments, a battery cell may include a lithium-ion secondary battery, a lithium-ion primary battery, a lithium-sulfur battery, a sodium/lithium-ion battery, a sodium-ion battery or a magnesium-ion battery, and the like. Generally, the battery cell may also be referred to as a cell. The battery cell may be cylindrical, flat, cuboid or in another regular or irregular shape. The technical solutions in the embodiments of the present application may be applied to a battery cell in any shape, in particular, suitable to a battery cell in a cuboid shape.

The battery cell includes an electrode assembly and an electrolytic solution, and the electrode assembly is composed of a positive electrode sheet, a negative electrode sheet and a separator. The operation of the battery cell mainly relies on the movement of metal ions between the positive electrode sheet and the negative electrode sheet. The positive electrode sheet includes a positive electrode current collector and a positive electrode active material layer. The positive electrode active material layer is coated on a surface of the positive electrode current collector, and a positive electrode current collector not coated with the positive electrode active material layer protrudes from the positive electrode current collector coated with the positive electrode active material layer and is used as a positive tab. As an example, in a lithium-ion battery, the material of the positive electrode current collector may be aluminum, and the positive electrode active material may be lithium cobalt oxide, lithium iron phosphate, ternary lithium or lithium manganate, etc. The negative electrode sheet includes a negative electrode current collector and a negative electrode active material layer. The negative electrode active material layer is coated on a surface of the negative electrode current collector, and a negative electrode current collector not coated with the negative electrode active material layer protrudes from the negative electrode current collector coated with the negative electrode active material layer and is used as a negative tab. The material of the negative electrode current collector may be copper, and the negative electrode active material may be carbon or silicon, etc. In order to ensure that no fusing occurs when large current passes, the number of positive tabs is multiple and they are stacked together, and the number of negative tabs is multiple and they are stacked together. A material of the separator may be polypropylene (PP), polyethylene (PE), or the like. In addition, the electrode assembly may be in a coiled structure or a laminated structure, and the embodiments of the present application are not limited thereto.

In the box of the battery, a signal transmission component is usually included. The signal transmission component is configured to transmit a voltage and/or temperature signal of the battery cell. The signal transmission component may include a bus component, and the bus component is configured to realize electrical connection between the plurality of battery cells, such as parallel connection, series connection or series-parallel connection. The bus component can realize the electrical connection between the battery cells by connecting electrode terminals of the battery cells. In some embodiments, the bus component may be fixed on the electrode terminals of the battery cell by welding. The bus component transmits voltage of the battery cell, and a higher voltage will be obtained after the plurality of battery cells are connected in series. Correspondingly, electrical connection formed by the bus component may also be referred to as "high-voltage connection".

In addition to the bus component, the signal transmission component may further include a sensor device configured to sense the state of the battery cell, for example, the sensor device may be configured to measure and transmit a sensor signal such as temperature and state of charge of the battery cell. In the present application, an electrical connection member within the battery may include a bus component and/or a sensor device.

The bus component and the sensor device may be encapsulated in an insulating layer to form the signal transmission component. Correspondingly, the signal transmission component may be configured to transmit a voltage and/or a sensing signal of the battery cell. The signal transmission component does not have an insulating layer at the joint with the electrode terminal of the battery cell, that is, the insulating layer has an opening here, so as to be connected with the electrode terminal of the battery cell.

For the development of battery technology, many aspects of design factors, such as energy density, cycle life, discharge capacity, C-rate and other performance parameters, are taken into account at the same time. In addition, safety issues that may be caused during assembling of the battery cell should be also taken into account.

In order to increase the capacity of the battery cell and improve the performance of the battery cell, a plurality of electrode assemblies can be disposed in each battery cell. However, in the battery cell, it is difficult to realize parallel connection between a plurality of electrode assemblies. Moreover, in the process of welding tabs of the plurality of electrode assemblies, particulate matter generated is likely to fall into an interior of the battery cell, which brings about a risk of short circuit and further causes safety problems.

In view of this, the present application provides a technical solution. A connection member for connecting a tab and an electrode terminal in a battery cell includes a main body portion, and the main body portion includes a plurality of through grooves, and tabs of a plurality of electrode assemblies pass through corresponding through grooves from a first surface of the main body portion respectively to be electrically connected to a second surface of the main body portion, so as to be able to realize the connection of the plurality of electrode assemblies in an interior of the battery cell, and since the tab is connected to a side of the connection member away from the interior of the battery cell, a risk of short circuit caused by an end part of the tab inserted into an electrode sheet due to redundancy or vibration and shock at the end part of the tab is reduced. The connection member further includes a pin disposed on the second surface of the main body portion. The pin is configured to connect the electrode terminal of the battery cell. Since the pin is located at a side of the connection member away from the interior of the battery cell, particulate matter generated in the process of welding with the electrode terminal will be blocked by the main body portion of the connection member so as not to fall into the interior of the battery cell, thereby reducing the risk of short circuit, and improving the safety of the battery cell. It can be seen that through the through grooves and the pin disposed on the connection member, not only can the connection between the plurality of electrode assemblies in the interior of the battery cell be realized conveniently, but also the safety of the batter cell in the welding process can be ensured.

The technical solutions described in embodiments of the present application are applicable to various apparatuses using a battery, for example, a mobile phone, a portable device, a notebook computer, an electromobile, an electric toy, an electric tool, an electric vehicle, a ship, a spacecraft, or the like. For example, the spacecraft may include an airplane, a rocket, a space shuttle, a spaceship, and the like.

It should be understood that the technical solutions described in the embodiments of the present application are not only limited to the apparatus described above, but also suitable to all apparatuses using a battery. However, for the sake of brief illustration, description is made by an example of an electric vehicle in the following embodiments.

For example, as shown in FIG. 1, FIG. 1 is a schematic structural diagram of a vehicle 1 to which an embodiment of the present application is applicable. The vehicle 1 may be a fuel-powered vehicle, a gas-powered vehicle or a new energy vehicle, and the new energy vehicle may be a battery electric vehicle, a hybrid vehicle, an extended-range vehicle, or the like. A motor 40, a controller 30 and a battery 10 may be disposed inside the vehicle 1, and the controller 30 is configured to control the battery 10 to supply power to the motor 40. For example, the battery 10 may be disposed at the bottom, head or tail of the vehicle 1. The battery 10 may be configured to supply power to the vehicle 1. For example, the battery 100 may serve as an operation power supply of the vehicle 1, and is used for a circuit system of the vehicle 1, for example, for a working power demand of the vehicle 1 during startup, navigation, and running. In some embodiments, the battery 10 can not only serve as an operation power supply of the vehicle 1, but also as a driving power supply of the vehicle 1, replacing or partially replacing fuel or natural gas to provide driving power for the vehicle 1.

In order to satisfy different power usage requirements, the battery 10 can include a plurality of battery cells. The plurality of battery cells may be in series connection, parallel connection or series-parallel connection, and the series-parallel connection means the mixing of series connection and parallel connection. The battery may also referred to as a battery pack. In some embodiments, the plurality of battery cells may be firstly connected in series, in parallel or in series-parallel to form a battery module, and then a plurality of battery modules are connected in series or in parallel or in series-parallel to form the battery 10. That is, the plurality of battery cells may form the battery 10 directly, or the plurality of battery cells may form a battery module first and then battery modules form the battery 10.

Figure 2:
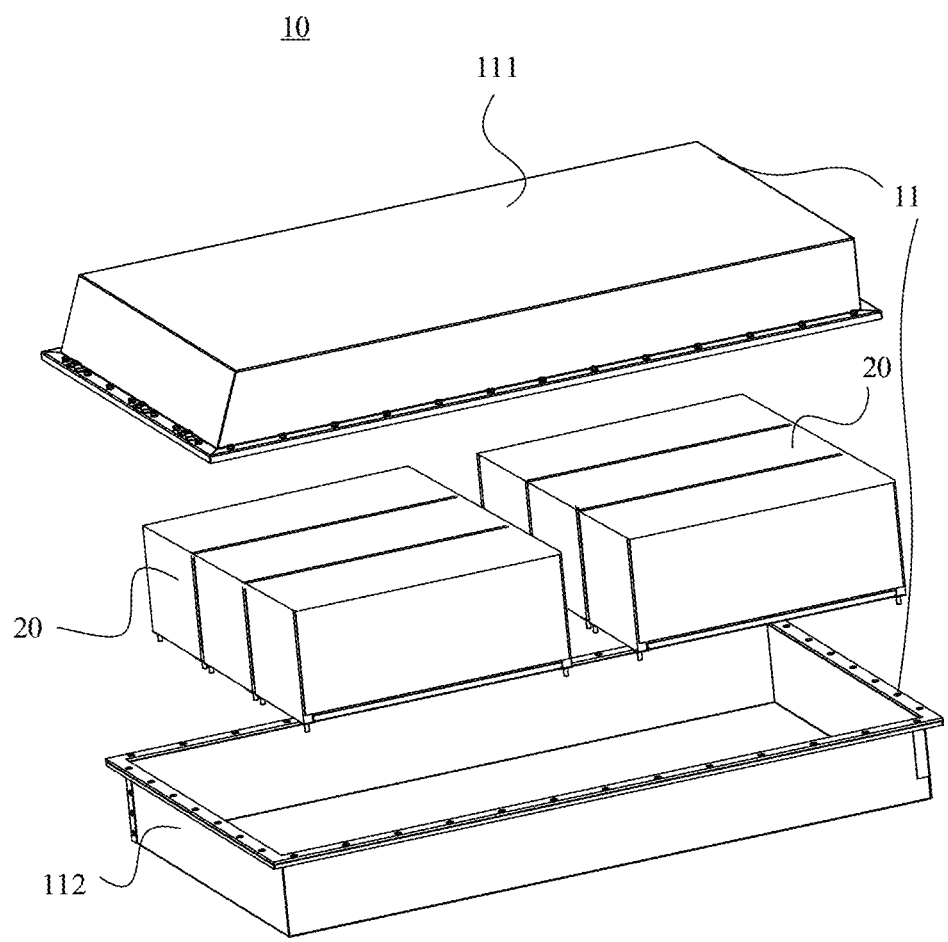
FIG. 2 is a schematic structural diagram of a battery disclosed in an embodiment of the present application.

For example, as shown in FIG. 2, FIG. 2 is a schematic structural diagram of a battery 10 according to an embodiment of the present application. The battery 10 may include at least one battery module 200. The battery module 200 includes a plurality of battery cells 20. The battery 10 may further include a box 11, an interior of the box 11 is in a hollow structure, and the plurality of battery cells 20 are accommodated in the box 11. As shown in FIG. 2, the box 11 may include two portions, which are herein referred to as a first box portion 111 (an upper box) and a second box portion 112 (a lower box), and the first box portion 111 and the second box portion 112 are buckled with each other. The shapes of the first box portion 111 and the second box portion 112 may be determined according to the combined shape of the plurality of battery cells 20, and at least one of the first box portion 111 and the second box portion 112 may have an opening. For example, as shown in FIG. 2, the first box portion 111 and the second box portion 112 can be both in a hollow cuboid shape and have only one face that is an opening face respectively, an opening of the first box portion 111 and an opening of the second box portion 112 are oppositely arranged, and the first box portion 111 and the second box portion 112 are buckled with each other to form the box 11 with a closed cavity. For another example, in contrast with what is shown in FIG. 2, only one of the first box portion 111 and the second box portion 112 may be a hollow cuboid with an opening, while the other may be in a shape of a plate to cover the opening. For example, description is made herein by an example that the second box portion 112 is a hollow cuboid and has only one face that is an opening face, while the first box portion 111 is in a plate shape. Therefore, the first box portion 111 covers the opening of the second box portion 112 to form the box 11 with a closed cavity, and the cavity can be configured to accommodate the plurality of battery cells 20. The plurality of battery cells 20 are combined in parallel, in series or in series-parallel and then placed in the box 11 formed by buckling the first box portion 111 and the second box portion 112.

In some embodiments, the battery 10 may also include other structures, which will not be repeated here. For example, the battery 10 may further include a bus component configured to realize electrical connection between the plurality of battery cells 20. Specifically, the bus component can realize the electrical connection between the battery cells 20 by connecting electrode terminals of the battery cells 20. In some embodiments, the bus component may be fixed on the electrode terminals of the battery cell 20 by welding. Electric energy of the plurality of battery cells 20 can be further drawn out by a conductive mechanism passing through the box. The conductive mechanism can also belong to the bus component.

Figure 3A:
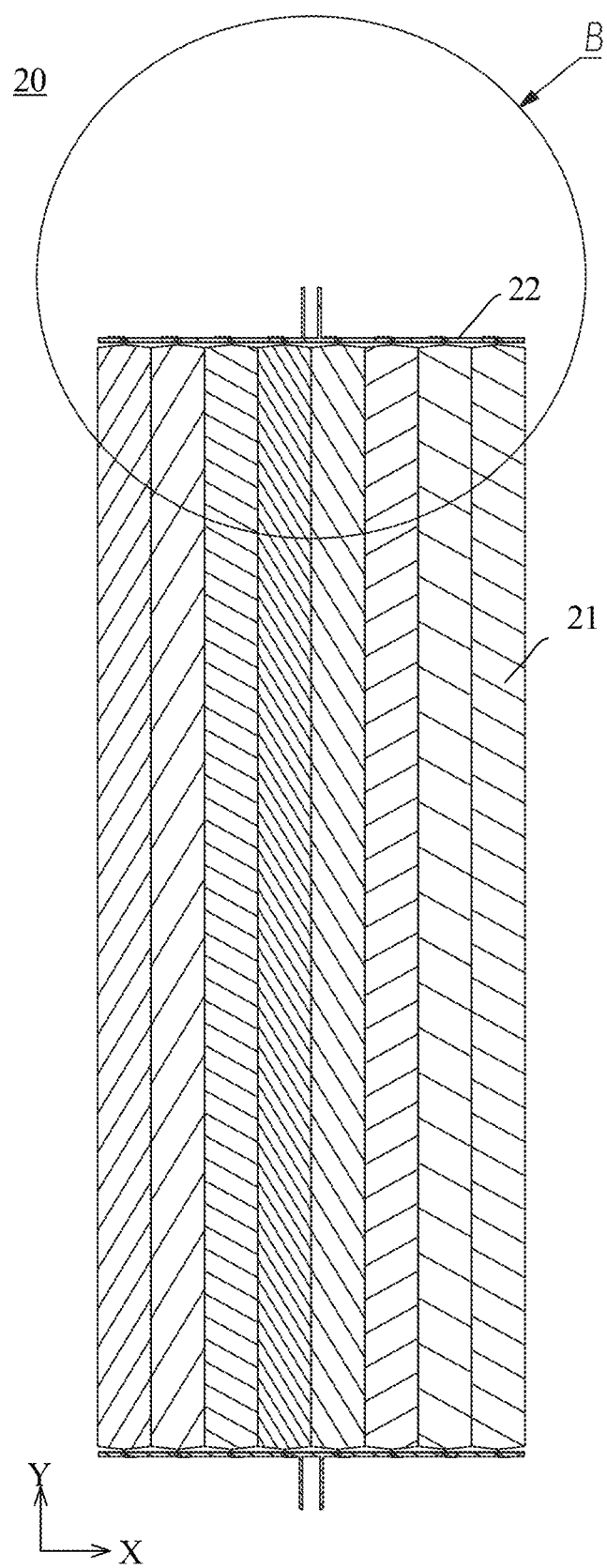
FIG. 3A is a cross-sectional view of a partial structure of a battery cell according to an embodiment of the present application.
Figure 3B:
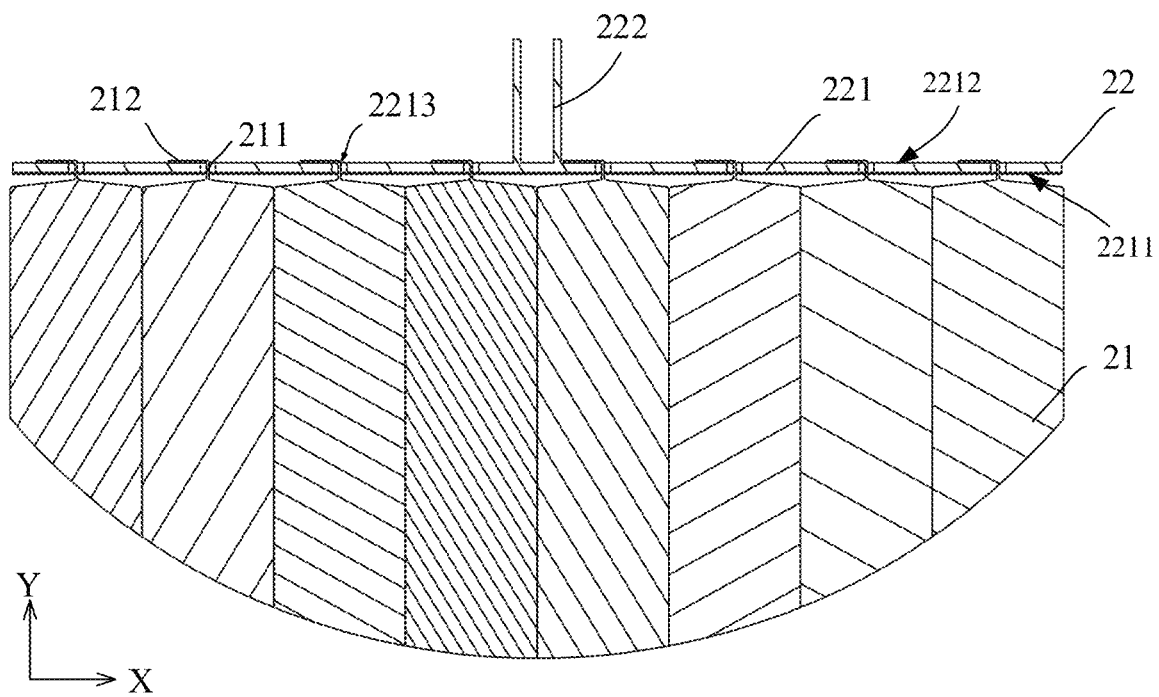
FIG. 3B is a partially enlarged view of area B in FIG. 3A.

FIG. 3A is a cross-sectional view of a partial structure of a battery cell 20 according to an embodiment of the present application, and FIG. 3B is a partial enlarged view of area B in FIG. 3A. As shown in FIGS. 3A and 3B, the battery cell 20 includes a plurality of electrode assemblies 21 and a connection member 22.

The plurality of electrode assemblies 21 are arranged along a first direction X, an end part of each electrode assembly 21 of the plurality of electrode assemblies 21 along a second direction Y is provided with a tab 211, and the second direction Y is perpendicular to the first direction X.

Figure 4:
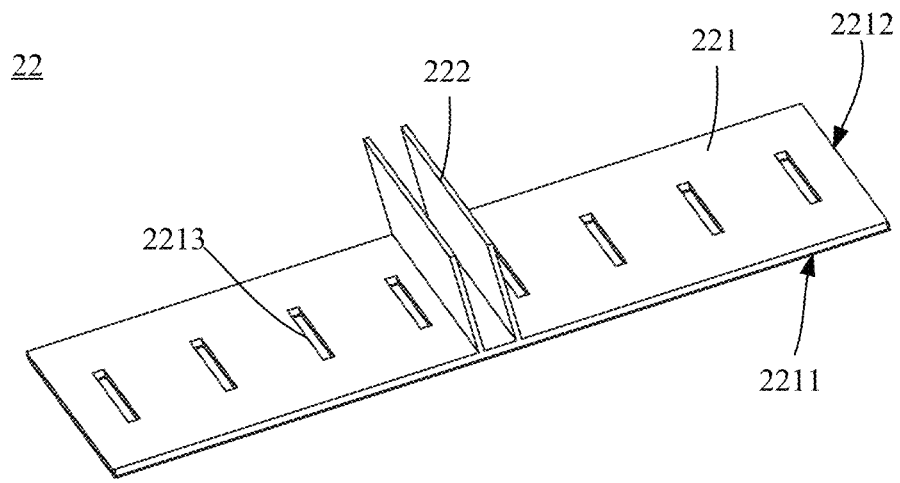
FIG. 4 is a schematic structural diagram of a connection member according to an embodiment of the present application.

The connection member 22 is configured to connect tabs 211 of the plurality of electrode assemblies 21 and an electrode terminal 23 of the battery cell 20. As shown in FIG. 4, the connection member 22 includes a main body portion 221 and a pin 222, the main body portion 221 extends along the first direction X, the main body portion 221 includes a first surface 2211 and a second surface 2212 perpendicular to the second direction Y, and the main body portion 221 is provided with a plurality of through grooves 2213 passing through the first surface 2211 and the second surface 2212.

As shown in FIG. 3B, the plurality of through grooves 2213 are respectively configured to accommodate the tabs 211 of the plurality of electrode assemblies 21, so that the tab 211 of each electrode assembly passes through a corresponding through groove 2213 from the first surface 2211 to be electrically connected to the second surface 2212, the pin 222 is disposed on the second surface 2212, and the pin 222 is configured to be electrically connected with the electrode terminal 23.

It should be understood that in FIG. 3A, FIG. 3B and FIG. 4, the battery cell 20 including eight electrode assemblies is taken as an example. In fact, by using the connection member 22 of the embodiment of the present application, connection of any number of the plurality of electrode assemblies 21 can be realized in an interior of the battery cell 20. The number of through grooves 2213 on the connection member 22 is greater than or equal to the number of electrode assemblies 21 in the battery cell 20, for example, the number of through grooves 2213 on the connection member 22 in FIG. 3A, FIG. 3B and FIG. 4 is also eight.

If the battery cell 20 includes only one electrode assembly 21, connecting a plurality of electrode assemblies 21 in parallel is actually connecting a plurality of battery cells 20 in parallel, for example, the plurality of battery cells 20 are connected in parallel through a bus component. However, in the embodiment of the present application, the parallel connection between the plurality of battery cells 20 is transformed into the parallel connection between the plurality of electrode assemblies 21 in the interior of the battery cell 20. This not only reduces the complex connection between the battery cells 20, but also enhances the structural stability of the interior of the battery cell 20.

Specifically, the connection member 22 in the battery cell 20 includes the main body portion 221, and the main body portion 221 includes the plurality of through grooves 2213, and the tabs 211 of the plurality of electrode assemblies 21 pass through the corresponding through grooves 2213 from the first surface 2211 of the main body portion 221 respectively to be electrically connected to the second surface 2212 of the main body portion 221, so as to be able to realize the connection of the plurality of electrode assemblies 21 in the interior of the battery cell 20, and since the tab 211 is connected to a side of the connection member 22 away from the interior of the battery cell 20, a risk of short circuit caused by the end part of the tab 211 inserted into an electrode sheet due to redundancy or vibration and shock at the end part of the tab 211 is reduced. The connection member 22 further includes the pin 222 disposed on the second surface 2212 of the main body portion 221. The pin 222 is configured to connect the electrode terminal 23 of the battery cell 20. Since the pin 222 is located at the side of the connection member 22 away from the interior of the battery cell 20, particulate matter generated in the process of welding with the electrode terminal 23 will be blocked by the main body portion 221 of the connection member 22 so as not to fall into the interior of the battery cell 20, thereby reducing the risk of short circuit, and improving the safety of the battery cell 20. It can be seen that through the through grooves 2213 and the pin 222 disposed on the connection member 22, not only can the connection between the plurality of electrode assemblies 21 in the interior of the battery cell 20 be realized conveniently, but also the safety of the process of welding the connection member 22 and the electrode terminal 23 can be ensured.

In some embodiments, as shown in FIG. 3B, a part of the tab 211 of each electrode assembly 21 protruding from the second surface 2212 is bent toward the first direction X to form a first connecting portion 212, and the first connecting portion 212 is welded to the second surface 2212.

Since the tab 211 of each electrode assembly 21 protrudes from the first surface 2211 of the connection member 22 to the second surface 2212, and is bent to form the first connecting portion 212, the first connecting portion 212 is welded to the second surface 2212 of the connection member 22, thereby reducing the difficulty of bending and welding the tab 211.

Figure 5A:
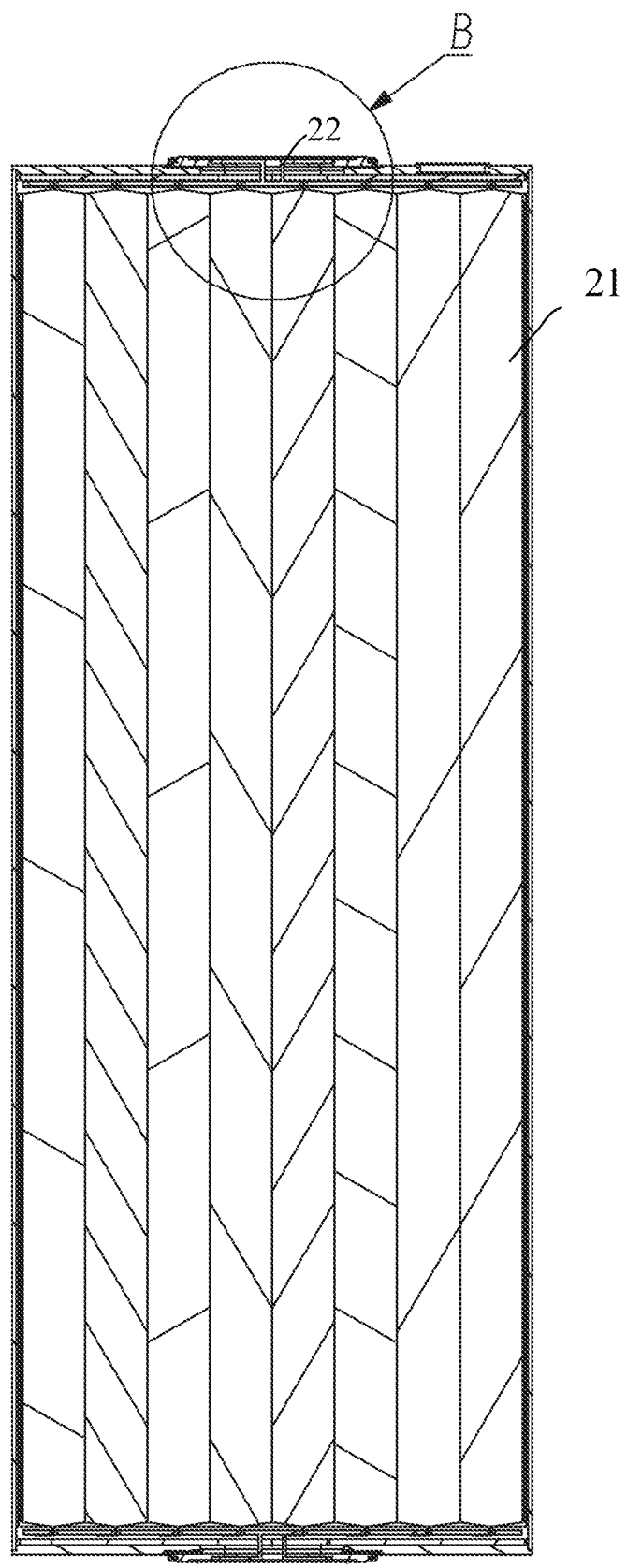
FIG. 5A is a cross-sectional view of a partial structure of a battery cell according to an embodiment of the present application.
Figure 5B:
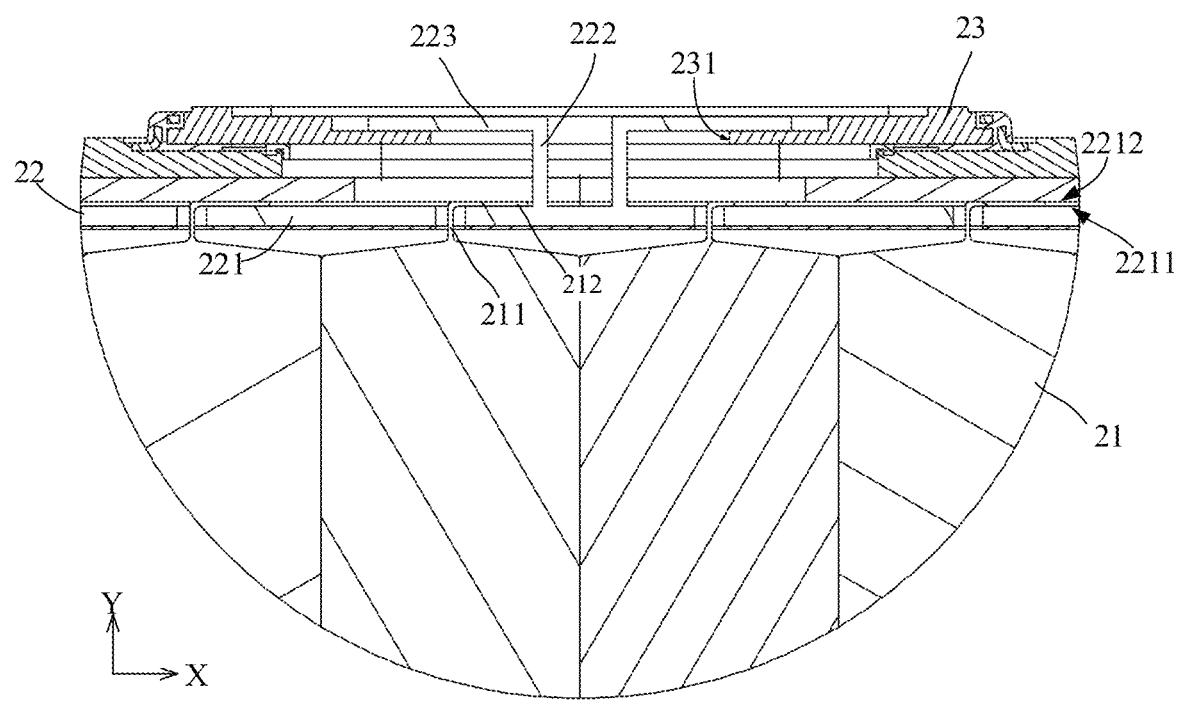
FIG. 5B is a partially enlarged view of area B in FIG. 5A.
Figure 6:
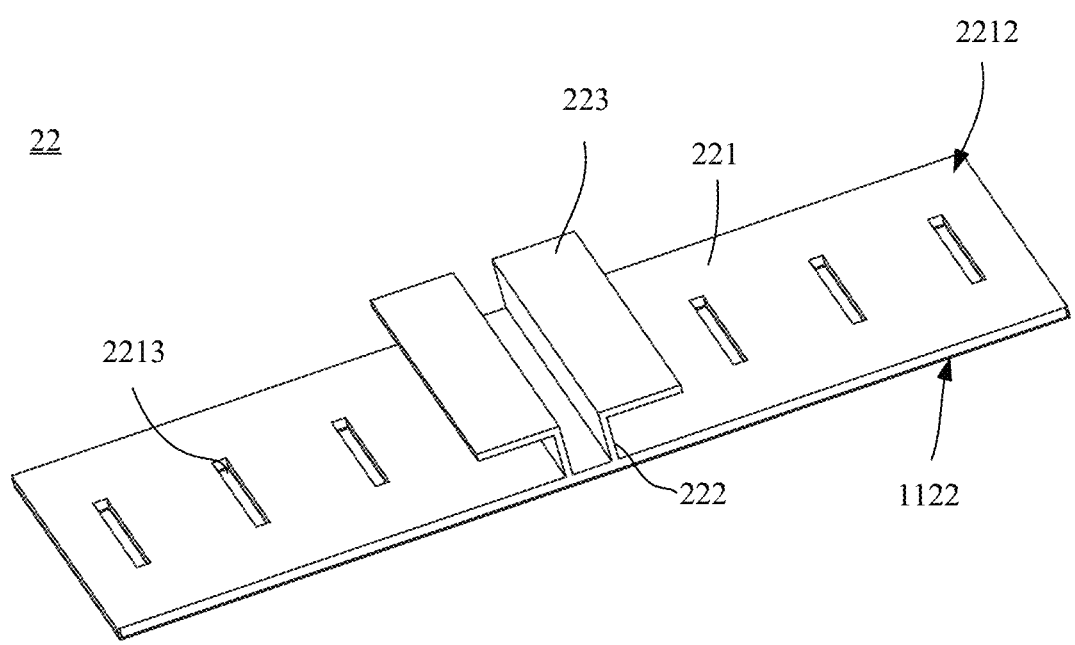
FIG. 6 is a schematic structural view of a connection member obtained after a pin is bent according to an embodiment of the present application.

FIG. 5A is a cross-sectional view of a partial structure of a battery cell 20 according to an embodiment of the present application, and FIG. 5B is a partial enlarged view of area B in FIG. 5A. In some embodiments, as shown in FIG. 5B, the electrode terminal 23 is provided with a through hole 231, and the pin 222 of the connection member 22 passes through the through hole 231 and is bent toward the electrode terminal 23 to form a second connecting portion 223 parallel to the second surface 2212, and the second connecting portion 223 is connected with the electrode terminal 23. The structure of the bent connection member 22 is shown in FIG. 6.

Since the pin 222 on the connection member 22 is located on the second surface 2212 away from the interior of the battery cell 20 and is bent to form the second connecting portion 223, the second connecting portion 223 passes through the through hole 231 of the electrode terminal 23 and is then connected with the electrode terminal 23, and difficulty of bending and welding the pin 222 is reduced.

As shown in FIG. 5B, when the pin 222 on the connection member 22 is welded with the electrode terminal 23, the pin 222 and the electrode terminal 23 are welded at a position away from the interior of the battery cell 20, and particles of fallen welding material will be blocked by the main body portion 221 of the connection member 22 so that they cannot fall to the electrode assembly 21, thereby reducing the risk of short circuit and improving the safety of the battery cell 20. Moreover, the pin 222 of the connection member 22 is disposed toward the outside of the battery cell 20, so as to make it more convenient to bend and weld the pin 222. The bending of the pin 222 and the welding with the electrode terminal 23 are not affected by the thickness of the main body portion 221 of the connection member 22.

The number of pins 222 may be one, or may be multiple, such as two, so as to be able to realize shunting at the position where the connection member 22 is connected with the electrode terminal 23, and avoid temperature rise caused by overcurrent in the battery cell 20. Especially when the thickness of the main body portion 221 of the connection member 22 is relatively large, shunt processing is performed at the position of the pin 222, that is, a plurality of bendable pins 222 are drawn out to be connected with the electrode terminal 23, which can improve safety and reliability of the battery cell 20.

The number of second connecting portions 223 may be one, or may be multiple. That is, each pin 222 may have one or more second connecting portions 223, so as to be able to realize shunting at the position where the connection member 22 is connected with the electrode terminal 23, and avoid temperature rise caused by overcurrent in the battery cell 20. Especially when the thickness of the main body portion 221 of the connection member 22 is relatively large, multiple second connecting portions 223 are used to realize shunting, that is, multiple second connecting portions 223 are drawn out to be connected with the electrode terminal 23, which can improve safety and reliability of the battery cell 20.

For the welding between the tab 211 of the electrode assembly 21 and the connection member 22, as well as the welding between the connection member 22 and the electrode terminal 23, welding means such as ultrasonic welding or laser welding can be adopted for example, which is not limited in the present application.

The material of the connection member 22 may be copper, for example. In some embodiments, a first insulating layer may be disposed on the first surface 2211 of the connection member 22 for isolating the plurality of electrode assemblies 21 from the connection member 22 so as to ensure the safety of the battery cell 20.

Figure 7A:
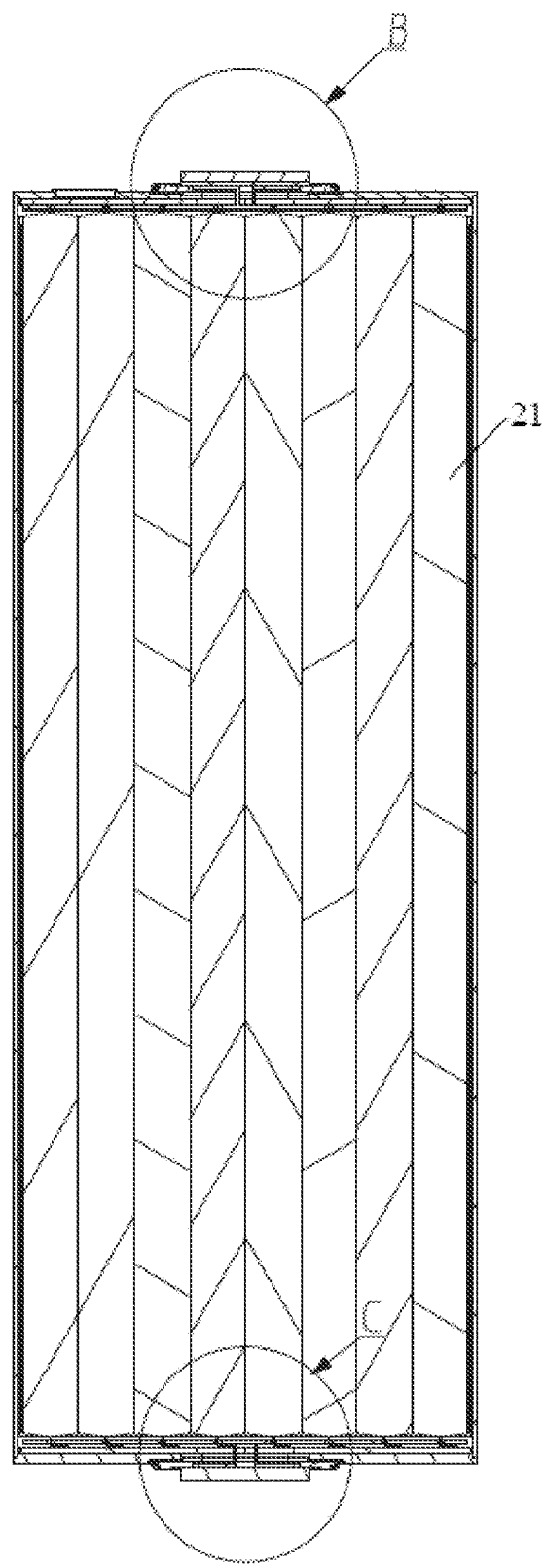
FIG. 7A is a cross-sectional view of a partial structure of a battery cell according to an embodiment of the present application.
Figure 7B:
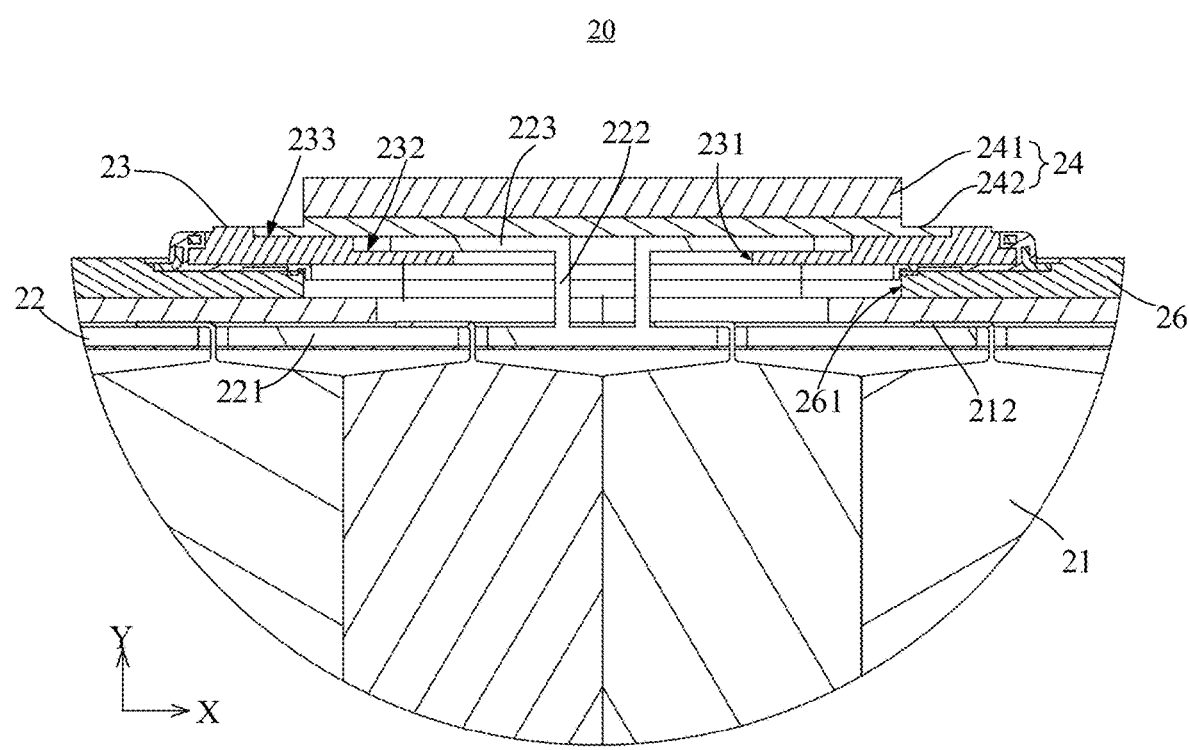
FIG. 7B is a partially enlarged view of area B in FIG. 7A.
Figure 7C:
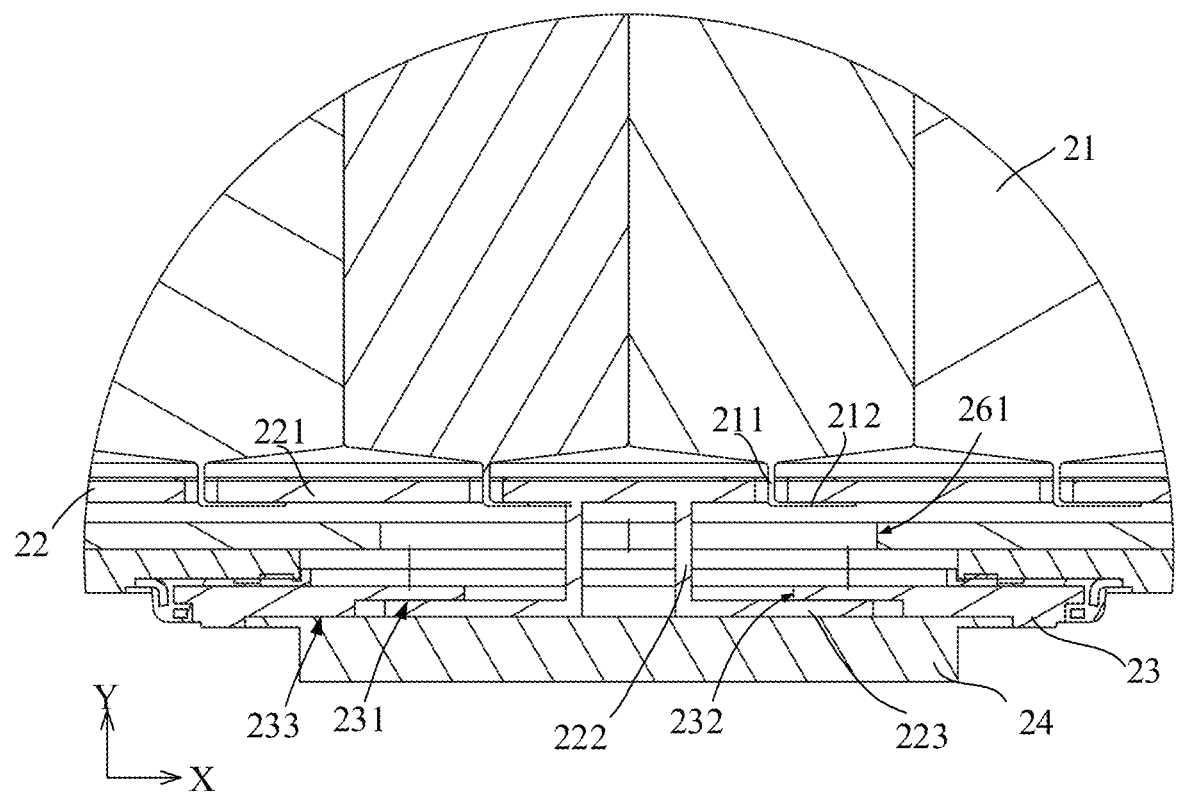
FIG. 7C is a partially enlarged view of area C in FIG. 7A.

FIG. 7A is a cross-sectional view of a partial structure of a battery cell 20 according to an embodiment of the present application, FIG. 7B is a partially enlarged view of area B in FIG. 7A, and FIG. 7C is a partial enlarged view of area C in FIG. 7A. FIGS. 7B and 7C respectively show two end parts of the battery cell 20 that are provided with two electrode terminals 23 with opposite polarities respectively. For example, FIG. 7B shows an end part with a negative electrode terminal, and FIG. 7C shows an end part with a positive electrode terminal. It can be understood that the connection member 22 and its connection method with a structure such as the electrode terminal 23 and the tab 211 in the embodiment of the present application can be applied to any end part of the battery cell 20.

In some embodiments, as shown in FIG. 7B and FIG. 7C, one end of the electrode terminal 23 away from an interior of the battery cell 20 is provided with a first step structure 232 surrounding the through hole 231, and the second connecting portion 223 is located in the first step structure 232 and welded with the first step structure 232.

The first step structure 232 can be configured to accommodate the second connecting portion 223 formed after the pin 222 of the connection member 22 is bent, which provides a welding space between the electrode terminal 23 and the second connecting portion 223, and improves a space utilization rate of the battery cell 20. The second connecting portion 223 is lap jointed in the first step structure 232. Since the second connecting portion 223 is away from the interior of the battery cell 20 relative to the first step structure 232, the electrode terminal 23 can be further prevented from being separated with a top cover 252 of the battery cell to a certain extent, which improves the structural safety of the battery cell 20.

In some embodiments, as shown in FIG. 7B and FIG. 7C, the battery cell 20 further includes: a metal sealing block 24, and the metal sealing block 24 covers the connection member 22 and the through hole 231 from a side away from the interior of the battery cell 20, and is connected with the electrode terminal 23. The metal sealing block 24 can realize the sealing of the battery cell 20 and improve the safety of the battery cell 20.

The materials of the positive electrode terminal and the negative electrode terminal are usually different. FIG. 7B is shown by an example that the electrode terminal 23 is a negative electrode terminal, and the metal sealing block 24 may be a copper-aluminum composite sealing block for example, which includes aluminum 241 and copper 242. FIG. 7C is shown by an example that the electrode terminal 23 is a positive electrode terminal, and the metal sealing block 24 may be an aluminum block for example.

In some embodiments, as shown in FIG. 7B and FIG. 7C, one end of the electrode terminal 23 away from the interior of the battery cell 20 is provided with a second step structure 233 surrounding the first step structure 232, the second step structure 233 is away from the interior of the battery cell 20 relative to the first step structure 232, an edge of the metal sealing block 24 is located in the second step structure 233, and the edge of the metal sealing block 24 forms a sealed connection with the second step structure 233 by means of welding.

The second step structure 233 can be configured to accommodate the metal sealing block 24, provide a welding space between the metal sealing block 24 and the electrode terminal 23, and improve the space utilization rate of the battery cell 20. In addition, since the metal sealing block 24 is away from the interior of the battery cell 20 relative to the second step structure 233, particulate matter generated in the process of welding can be further prevented from falling into the interior of the battery cell 20, and the safety of the battery cell 20 is improved.

In some embodiments, as shown in FIG. 7B and FIG. 7C, the metal sealing block 24 protrudes from the second step structure 233 along a direction away from the interior of the battery cell 20. The thickness of the metal sealing block 24 can exceed the depth of the second step structure 233, so that the metal sealing block 24 protrudes from the second step structure 233 toward the direction away from the interior of the battery cell 20, so as to facilitate subsequent connection operations of the battery cell 20, and enable the structure of the battery cell 20 to be more stable.

In some embodiments, the battery cell 20 further includes a housing 25 and an end cover 26. An end part of the housing 25 in the second direction Y is provided with an opening, and the housing 25 is configured to accommodate the plurality of electrode assemblies 21. The end cover 26 is configured to cover the opening, and the end cover 26 is provided with an electrode lead-out hole 261, the electrode terminal 23 surrounds the electrode lead-out hole 261, and the electrode terminal 23 protrudes from an interior of the electrode lead-out hole 261.

As shown in FIG. 7B and FIG. 7C, the electrode terminal 23 is disposed on the end cover 26 and is away from the interior of the battery cell 20 relative to the end cover 26. An outer edge of the electrode terminal 23 is fixedly connected to the end cover 26 through a fixing member.

The fixing member includes, for example, a first fixing member 271 and a second fixing member 272. In some embodiments, as an example, in FIG. 7B, the first fixing member 271 at least partially surrounds the electrode terminal 23, so as to fix the electrode terminal 23 to the first fixing member 271. The second fixing member 272 is connected to the end cover 26, and the second fixing member 272 is separated from the electrode terminal 23 by the first fixing member 272. One of the second fixing member 272 and the first fixing member 271 is provided with an embedding hole 273, and the other of the second fixing member 272 and the first fixing member 271 is provided with an embedding part 274 embedded in the embedding hole. Hereinafter, description is made by an example that the second fixing member 272 is provided with the embedding hole 273 and the first fixing member 271 is provided with the embedding part 274. The second fixing member 272 can provide effective fastening force for the first fixing member 271 and the end cover 26.

Therefore, the end cover 26 and the electrode terminal 23 are connected to each other through the first fixing member 271 and the second fixing member 272. The first fixing member 271 is engaged with the electrode terminal 23. The second fixing member 272 is engaged with the end cover 26 and the first fixing member 271 at the same time, so that the first fixing member 271 and the electrode terminal 23 are connected and fixed to the end cover 26 through the second fixing member 272. The first fixing member 271 and the second fixing member 272 are connected and fixed to each other through the engagement of the embedding hole 273 and the embedding part 274. Since the embedding part 274 will be limited after being embedded in the embedding hole 273, the embedding part 274 is not easy to escape from the embedding hole 273 when subjected to an external force, and not easy to move along a radial direction of the embedding hole 273 relative to the embedding hole 273. Therefore, the first fixing member 271 and the second fixing member 272 are connected and fixed by means of embedding, which can ensure that the two are not easy to be separated from each other, and at the same time, the relative position of the two is not easy to change when they are subjected to external force. In this way, stability of connection between the first fixing member 271 and the second fixing member 272 is effectively improved, thereby effectively preventing the first fixing member 271 and the electrode terminal 23 from falling off or being separated from the end cover 26 so as not to cause problems such as liquid leakage of the battery cell 20, and improve the reliability and safety of the battery cell 20. In addition, since the fixing structure of the electrode terminal 23 in the interior of the housing 25 can be omitted, space occupied in the interior of the battery cell 20 can be reduced, so as to increase energy density of the battery cell 20.

Figure 8A:
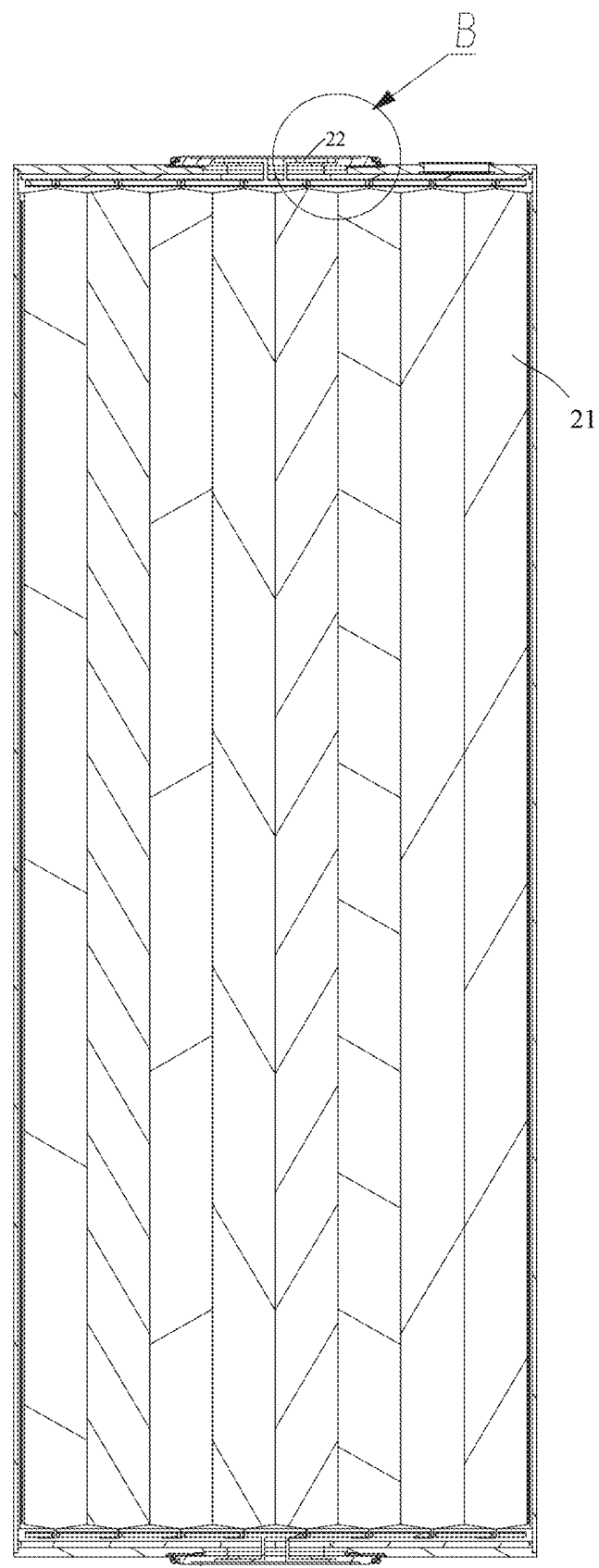
FIG. 8A is a cross-sectional view of a partial structure of a battery cell according to an embodiment of the present application.
Figure 8B:
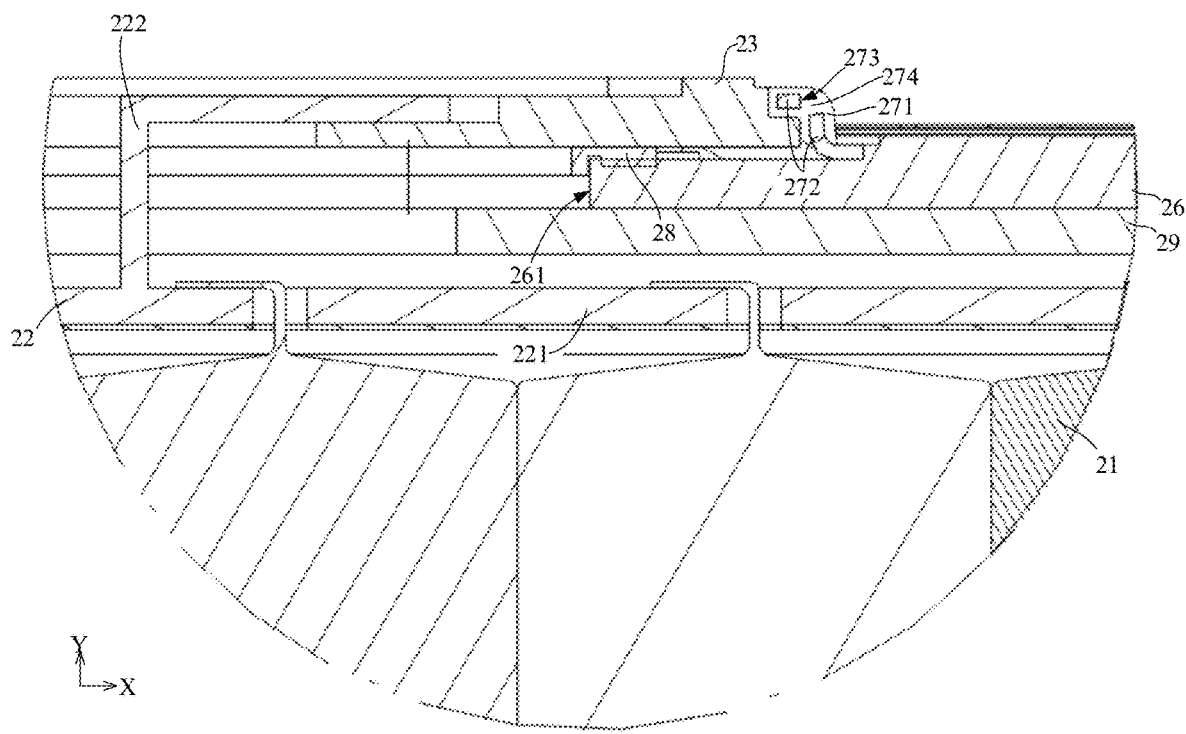
FIG. 8B is a partially enlarged view of area B in FIG. 8A.

FIG. 8A is a cross-sectional view of a partial structure of a battery cell 20 according to an embodiment of the present application, and FIG. 8B is a partial enlarged view of area B in FIG. 8A. In some embodiments, as shown in FIG. 8B, the battery cell 20 further includes a sealing member 28 disposed between the end cover 26 and the electrode terminal 23, and the sealing member 28 is disposed around the electrode lead-out hole 261 to form a sealed connection between the electrode terminal 23 and the end cover 26. The sealing member 28 can improve the sealing performance between the electrode terminal 23 and the end cover 26, avoid the problem of liquid leakage caused by poor sealing between the electrode terminal 23 and the end cover 26, and can further improve the reliability of the battery cell 20.

On the one hand, as mentioned above, the metal sealing block 24 covers the connection member 23 located in the through hole 231 of the electrode terminal 23 and the through hole 231, and an edge of the metal sealing block 24 is connected with the electrode terminal 23 in a sealing manner. On the other hand, as shown in FIG. 8B, the sealing member 28 is disposed between the electrode terminal 23 and the end cover 26 to seal the electrode terminal 23 and the end cover 26. In this way, under the combined action of the metal sealing block 24 and the sealing member 28, effective sealing of the battery cell 20 can be realized, and the safety of the battery cell 20 is improved.

In some embodiments, the end cover 26 is provided with an annular groove, the sealing member 28 can be accommodated in the annular groove, and the second fixing member 272 is configured to enable the electrode terminal 23 to press the sealing member 28 toward the end cover 26 so as to form sealing between the electrode terminal 23 and the end cover 26. The annular groove is configured to accommodate the sealing member 28, which facilitates the positioning of the sealing member 28 and increases the sealing effect.

Figure 9A:
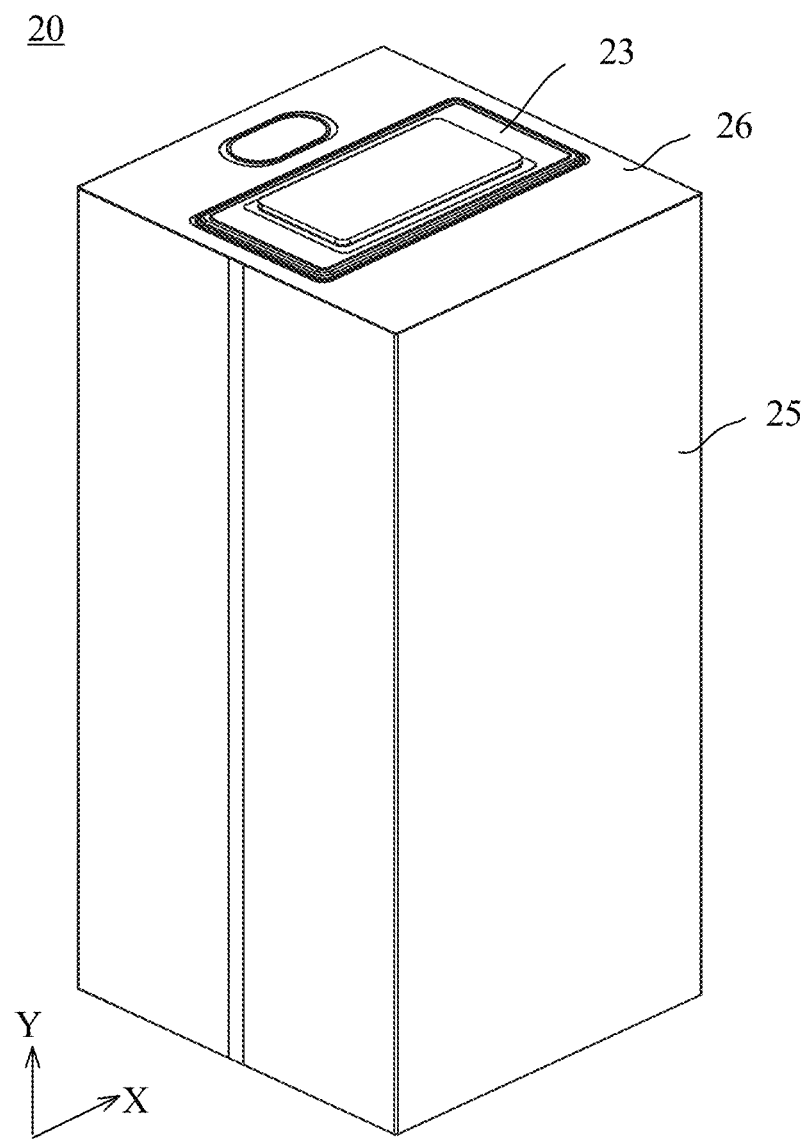
FIG. 9A is a schematic structural diagram of a battery cell according to an embodiment of the present application.
Figure 9B:
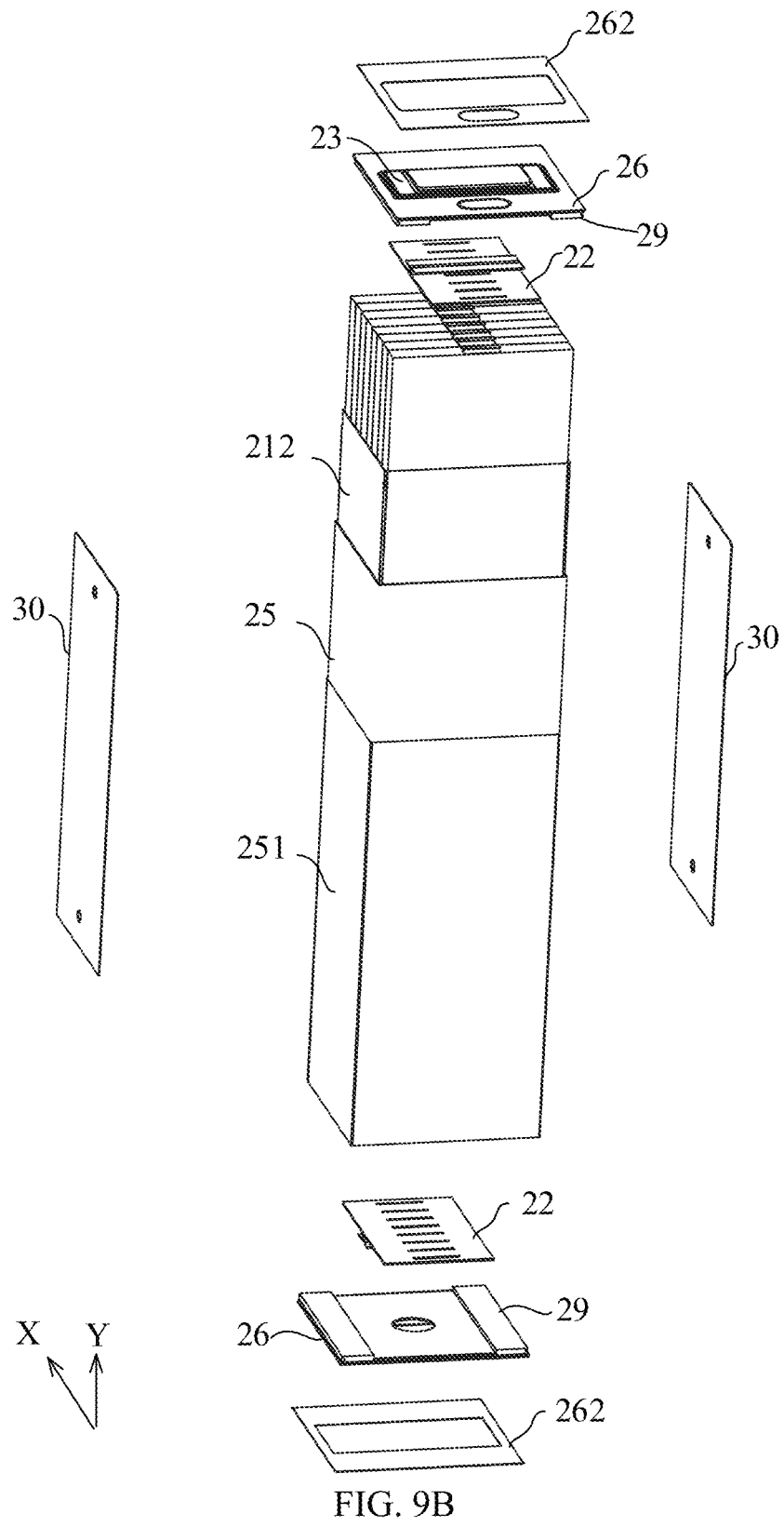
FIG. 9B is an exploded view of the battery cell in FIG. 9A.

FIG. 9A is a schematic structural diagram of a battery cell 20, and FIG. 9B is an exploded view of the battery cell 20 in FIG. 9A. In some embodiments, as shown in FIG. 9A and FIG. 9B, the battery cell 20 further includes a spacer plate 30 covering surfaces of the plurality of electrode assemblies 21 parallel to the first direction X and the second direction Y, and the spacer plate 30 is configured to isolate the surfaces of the plurality of electrode assemblies 21 from the housing 25. The spacer plate 30 can protect the electrode assemblies 21, and during the process of putting the electrode assemblies 21 into the housing, it can avoid damage caused by friction between a separator coated on outer surfaces of the electrode assemblies 21 and a wall of the housing 25, and prevent an electrode sheet from being bent and creased at an R corner of the housing, and further avoid the risk of short circuit.

In some embodiments, the battery cell 20 further includes an insulating member 29, also referred to as a plastic member 29 or a lower plastic member 29, disposed between the second surface 2212 of the connection member 22 and the end cover 26. The spacer plate 30 is connected with the insulating member 29 to fix the spacer plate 30 to the surfaces of the plurality of electrode assemblies 21. The connection between the spacer plate 30 and the electrode assemblies 21 can be realized by only connecting the spacer plate 30 with the insulating member 29, which is simple in assembling, and does not require an additional component.

For example, the insulating member 29 is provided with a buckle along the first direction X. The spacer plate 30 is provided with a notch, and the buckle engages with the notch to fix the spacer plate 30 on the surfaces of the plurality of electrode assemblies 21. As long as the buckle is disposed on the original insulating member 29 and the notch is disposed at the corresponding position of the spacer plate 30, the connection between the spacer plate 30 and the electrode assemblies 21 can be easily realized through cooperation of the buckle and the notch.

Of course, it is also possible that a buckle is disposed on the spacer plate 30, and a notch is disposed at the corresponding position of the insulating member 29, and the connection between the spacer plate 30 and the electrode assemblies 21 can also be realized through cooperation of the buckle and the notch.

In some embodiments, as shown in FIGS. 8B and 9B, the surfaces of the plurality of electrode assemblies 21 are provided with a second insulating layer 212, and the spacer plate 30 is connected to the second insulating layer 212 by heat fusion. In this way, the connection between the spacer plate 30 and the electrode assemblies 21 can be realized without setting an additional structure.

In some embodiments, as shown in FIG. 9B, a layer of patch 262 may also be pasted on a surface of the end cover 26 for protecting the surface of the end cover 26.

In some embodiments, as shown in FIG. 9B, a layer of blue film 251 may also be pasted on a surface of the housing 25 for protecting the surface of the housing 25.

The above technical solution may be applied to various types of electrode assemblies, and has a wide range of applications. For example, the electrode assembly 21 may have a coiled structure and be flat, and an outer surface of the electrode assembly 20 includes two flat surfaces, and the two flat surfaces are disposed opposite to each other along the first direction; or, the electrode assembly 20 has a laminated structure, and a first electrode sheet, a separator and a second electrode sheet of the electrode assembly 20 are stacked along the first direction. The technical solution of the present application is described above by an example of the electrode assembly 21 in a laminated structure, in which a space utilization rate is higher and a strength is more optimal.

Based on the above description, it can be seen that the connection member 22 provided by the embodiment of the present application effectively solves the problem of connecting the plurality of electrode assemblies 21 in the interior of the battery cell 20, and pairing processing on the tabs 211 of the respective electrode assemblies 21 is not needed to be carried out in advance. Since the tab 211 is connected to a side of the connection member 22 away from the interior of the battery cell 20, a risk of short circuit caused by the end part of the tab 211 inserted into an electrode sheet due to redundancy or vibration and shock at the end part of the tab 211 is reduced, and an additional structure such as PET is not required to be set to shape and support the tab 211, which further eliminates the risk of short circuit caused by the insertion of PET into the electrode sheet due to vibration and shock or the like. Moreover, since the bending of the pin 222 of the connection member 22 and the welding with the electrode terminal 23 are both carried out at the side of the connection member 22 away from the interior of the battery cell 20, particulate matter generated in the welding process will be blocked by the connection member 22 so as not to fall into the interior of the battery cell 20, which reduces the risk of short circuit and improves the safety of the battery cell 20. The above bending of the tab 211 and its welding with a support of the connection member 22, as well as the bending of the pin 222 of the connection member 22 and its welding with the electrode terminal 23 are all simple in operation processes and easy for implementation.

An embodiment of the present application further provides a battery 10, and the battery 10 includes the battery cell 20 in the foregoing embodiments.

An embodiment of the present application further provides a power consumption device, including the battery cell 20 or the battery 10 in the foregoing embodiments, so as to provide electric energy for the power consumption device.

The battery cell 20, the battery 10, and the power consumption device of the embodiments of the present application are described above, and a method 300 and device 400 for manufacturing a battery cell 20 of embodiments of the present application will be described below, and for parts that are not described in detail, reference can be made to the foregoing embodiments.

Figure 10:
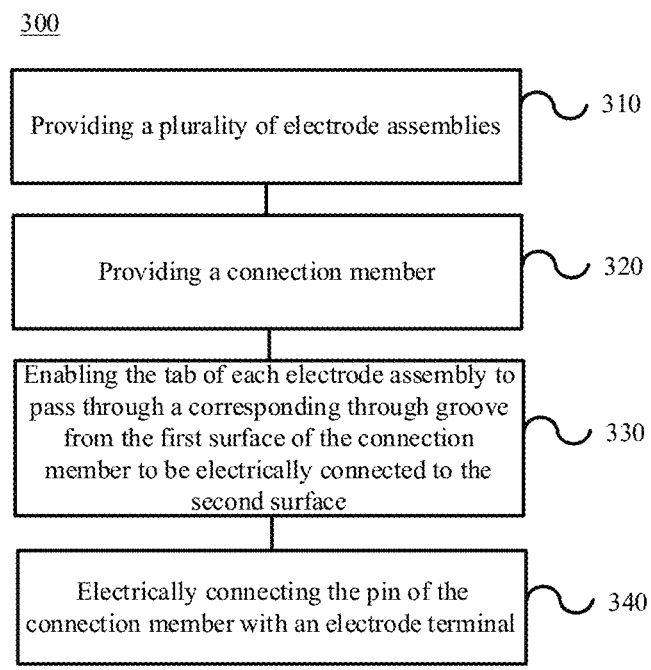
FIG. 10 is a schematic flowchart of a method for manufacturing a battery cell according to an embodiment of the present application.

FIG. 10 shows a schematic flowchart of a method 300 for manufacturing a battery cell 20 according to an embodiment of the present application. The method 300 includes some or all of the following steps.

In step 310, providing a plurality of electrode assemblies 21, where the plurality of electrode assemblies 21 are arranged along a first direction X, and an end part of each electrode assembly 21 of the plurality of electrode assemblies 21 along a second direction Y is provided with a tab 211, and the second direction Y is perpendicular to the first direction X.

In step 320, providing a connection member 22, where the connection member 22 includes a main body portion 221 and a pin 222, the main body portion 221 extends along the first direction X, the main body portion 221 includes a first surface 2211 and a second surface 2212 perpendicular to the second direction Y, the main body portion 221 is provided with a plurality of through grooves 2213 passing through the first surface 2211 and the second surface 2212, the plurality of through grooves 2213 are respectively configured to accommodate tabs 211 of the plurality of electrode assemblies 21, and the pin 222 is disposed on the second surface 2212.

In step 330, enabling the tab 211 of each electrode assembly 21 to pass through a corresponding through groove 2213 from the first surface 2211 of the connection member 22 to be electrically connected to the second surface 2212.

In step 340, electrically connecting the pin 222 of the connection member 22 with an electrode terminal 23.

Figure 11:
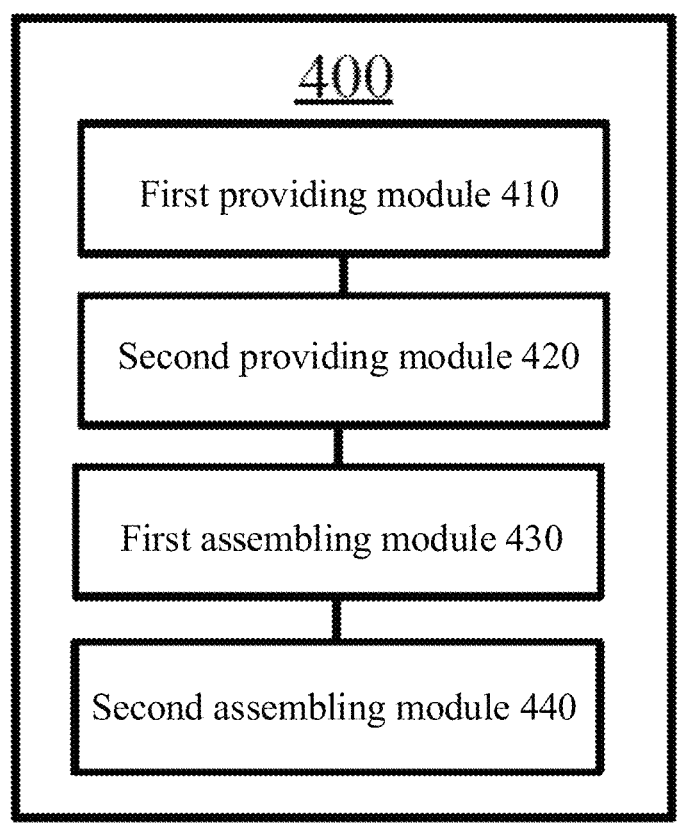
FIG. 11 is a schematic block diagram of a device for manufacturing a battery cell according to an embodiment of the present application.

FIG. 11 shows a schematic block diagram of a device 400 for manufacturing a battery cell 20 according to an embodiment of the present application. The device 400 includes: a first providing module 410 configured to provide a plurality of electrode assemblies 21, where the plurality of electrode assemblies 21 are arranged along a first direction X, and an end part of each electrode assembly 21 of the plurality of electrode assemblies 21 along a second direction Y is provided with a tab 211, and the second direction Y is perpendicular to the first direction X; a second providing module 420 configured to provide a connection member 22, where the connection member 22 includes a main body portion 221 and a pin 222, the main body portion 221 extends along the first direction X, the main body portion 221 includes a first surface 2211 and a second surface 2212 perpendicular to the second direction Y, the main body portion 221 is provided with a plurality of through grooves 2213 passing through the first surface 2211 and the second surface 2212, the plurality of through grooves 2213 are respectively configured to accommodate tabs 211 of the plurality of electrode assemblies 21, and the pin 222 is disposed on the second surface 2212; a first assembling module 430 configured to enable the tab 211 of each electrode assembly 21 to pass through a corresponding through groove 2213 from the first surface 2211 of the connection member 22 to be electrically connected to the second surface 2212; and a second assembling module 440 configured to electrically connect the pin 222 of the connection member 22 with an electrode terminal 23.

While the present application has been described with reference to some embodiments, various improvements may be made and equivalents may be used to substitute parts therein without departing from the scope of the present application. In particular, as long as there is no structural conflict, technical features mentioned in various embodiments can be combined in any manner. The present application is not limited to the specific embodiments disclosed herein, but includes all technical solutions falling within the scope of the claims.

What is claimed is:

1. A battery cell, comprising:
    a plurality of electrode assemblies arranged along a first direction, wherein an end part of each electrode assembly of the plurality of electrode assemblies along a second direction is provided with a tab, and the second direction is perpendicular to the first direction; and
    a connection member configured to connect tabs of the plurality of electrode assemblies and an electrode terminal of the battery cell, wherein the connection member comprises a main body portion and a pin, the main body portion extends along the first direction, the main body portion comprises a first surface and a second surface perpendicular to the second direction, the main body portion is provided with a plurality of through grooves passing through the first surface and the second surface, and the plurality of through grooves are respectively configured to accommodate the tabs of the plurality of electrode assemblies, so that the tab of each electrode assembly passes through a corresponding through groove from the first surface to be electrically connected to the second surface, the pin is disposed on the second surface, and the pin is configured to be electrically connected with the electrode terminal.

2. The battery cell according to claim 1, wherein a part of the tab of each electrode assembly protruding from the second surface is bent toward the first direction to form a first connecting portion, and the first connecting portion is welded to the second surface.

3. The battery cell according to claim 1, wherein the electrode terminal is provided with a through hole, the pin passes through the through hole and is bent toward the electrode terminal to form a second connecting portion parallel to the second surface, and the second connecting portion is connected with the electrode terminal.

4. The battery cell according to claim 3, wherein one end of the electrode terminal away from an interior of the battery cell is provided with a first step structure surrounding the through hole, and the second connecting portion is located in the first step structure and welded with the first step structure.

5. The battery cell according to claim 4, further comprising:
    a metal sealing block, wherein the metal sealing block covers the connection member and the through hole from a side away from the interior of the battery cell, and is connected with the electrode terminal.

6. The battery cell according to claim 5, wherein one end of the electrode terminal away from the interior of the battery cell is provided with a second step structure surrounding the first step structure, the second step structure is away from the interior of the battery cell relative to the first step structure, an edge of the metal sealing block is located in the second step structure, and the edge of the metal sealing block forms a sealed connection with the second step structure by means of welding.

7. The battery cell according to claim 6, wherein the metal sealing block protrudes from the second step structure along a direction away from the interior of the battery cell.

8. The battery cell according to claim 1, wherein the first surface of the connection member is provided with a first insulating layer for isolating the plurality of electrode assemblies from the connection member.

9. The battery cell according to claim 1, further comprising:
    a housing, an end part of which in the second direction is provided with an opening, wherein the housing is configured to accommodate the plurality of electrode assemblies; and
    an end cover configured to cover the opening, wherein the end cover is provided with an electrode lead-out hole, the electrode terminal surrounds the electrode lead-out hole, and the electrode terminal protrudes from an interior of the electrode lead-out hole.

10. The battery cell according to claim 9, wherein the end cover comprises:
    a first fixing member, wherein the first fixing member at least partially surrounds the electrode terminal, so as to fix the electrode terminal to the first fixing member; and
    a second fixing member, wherein the second fixing member is connected to the end cover, and the second fixing member is separated from the electrode terminal by the first fixing member;
    wherein one of the first fixing member and the second fixing member is provided with an embedding hole, and the other of the first fixing member and the second fixing member is provided with an embedding part embedded in the embedding hole.

11. The battery cell according to claim 10, further comprising:
    a sealing member disposed between the end cover and the electrode terminal, wherein the sealing member is disposed around the electrode lead-out hole to form a sealed connection between the electrode terminal and the end cover.

12. The battery cell according to claim 11, wherein the end cover is provided with an annular groove, the sealing member is accommodated in the annular groove, and the second fixing member is configured to enable the electrode terminal to press the sealing member toward the end cover so as to form sealing between the electrode terminal and the end cover.

13. The battery cell according to claim 9, further comprising:
a spacer plate covering surfaces of the plurality of electrode assemblies parallel to the first direction and the second direction, wherein the spacer plate is configured to isolate the surfaces of the plurality of electrode assemblies from the housing.

14. The battery cell according to claim 13, wherein the surfaces of the plurality of electrode assemblies are provided with a second insulating layer, and the spacer plate is connected to the second insulating layer by heat fusion.

15. The battery cell according to claim 13, further comprising:
an insulating member disposed between the second surface of the connection member and the end cover, wherein the spacer plate is connected with the insulating member to fix the spacer plate to the surfaces of the plurality of electrode assemblies.

16. The battery cell according to claim 1, wherein the pin is one of a plurality of pins, and/or the pin has one or more second connecting portions.

17. The battery cell according to claim 1, wherein:
the electrode assembly has a coiled structure and is flat, and an outer surface of the electrode assembly comprises two flat surfaces, and the two flat surfaces are disposed opposite to each other along the first direction; or
the electrode assembly has a laminated structure, and a first electrode sheet, a separator and a second electrode sheet of the electrode assembly are stacked along the first direction.

18. A battery comprising the battery cell according to claim 1.

19. A power consumption device comprising the battery cell according to claim 1, wherein the battery cell is configured to provide electric energy.

20. A method for manufacturing a battery cell, comprising:
providing a plurality of electrode assemblies, wherein the plurality of electrode assemblies are arranged along a first direction, an end part of each electrode assembly of the plurality of electrode assemblies along a second direction is provided with a tab, and the second direction is perpendicular to the first direction;
providing a connection member, wherein the connection member comprises a main body portion and a pin, the main body portion extends along the first direction, the main body portion comprises a first surface and a second surface perpendicular to the second direction, the main body portion is provided with a plurality of through grooves passing through the first surface and the second surface, the plurality of through grooves are respectively configured to accommodate tabs of the plurality of electrode assemblies, and the pin is disposed on the second surface;
enabling the tab of each electrode assembly to pass through a corresponding through groove from the first surface of the connection member to be electrically connected to the second surface; and
electrically connecting the pin of the connection member with an electrode terminal.

\* \* \* \* \*